United States Patent

Anderson et al.

[15] 3,675,240

[45] July 4, 1972

[54] KEYBOARD ENCODING ARRANGEMENT

[72] Inventors: Robert V. Anderson, Westfield; David W. Hagelbarger, Morris Township, Morris County, both of N.J.

[73] Assignee: Bell Telephone Laboratories, Incorporated, Murray Hill, N.J.

[22] Filed: Dec. 23, 1969

[21] Appl. No.: 887,655

[52] U.S. Cl. .............................340/365, 178/17 C, 235/145

[51] Int. Cl. ..........................................................G08c 1/00

[58] Field of Search .......................340/365, 166 C, 174 PM; 235/145, 146; 179/90 K; 178/17 A, 17 C, 79, 81

[56] References Cited

UNITED STATES PATENTS

| | | | |
|---|---|---|---|
| 3,129,418 | 4/1964 | De La Tour | 340/345 |
| 3,478,857 | 11/1969 | Linker | 235/145 |
| 2,997,703 | 8/1961 | Powell | 340/365 |
| 3,469,242 | 9/1969 | Eachus et al. | 340/174 PM |
| 3,291,910 | 12/1966 | Nicklas et al. | 178/79 |
| 3,210,743 | 10/1965 | Kaenel | 340/365 X |
| 3,453,387 | 7/1969 | Bagley | 178/17.5 |
| 3,454,717 | 7/1969 | Peters | 340/365 X |
| 3,493,928 | 2/1970 | Juliusburger | 340/365 X |
| 3,541,548 | 11/1970 | Cogar et al. | 340/384 R |

OTHER PUBLICATIONS

IBM Technical Disclosure, Vol. 12 No. 3, August 1969, page 436, " Magnetoresistive Contact-less Switch," McDowell et al.

*Primary Examiner*—John W. Caldwell
*Assistant Examiner*—Robert J. Mooney
*Attorney*—R. J. Guenther and Kenneth B. Hamlin

[57] ABSTRACT

A magnetic keyboard and associated encoding circuitry are described. A permanent magnet on each of the keys of the keyboard alters the switching characteristics of a ferrite core associated with that key when the key is depressed. Logic circuitry is provided which determines when the addresses of depressed keys are to be entered in an output shift register and which addresses are to be transmitted. A unique lockout feature prevents both the transmission of address information from the output shift register if more than one key is depressed and the inadvertent retransmission of the address of a core already transmitted.

5 Claims, 3 Drawing Figures

INVENTORS R. V. ANDERSON
D. W. HAGELBARGER
BY Lucian C. Canepa
ATTORNEY

PATENTED JUL. 4 1972 3,675,240

SHEET 2 OF 2

KEYBOARD ENCODING ARRANGEMENT

BACKGROUND AND BRIEF DESCRIPTION

This invention relates to manually operated data input systems and more particularly to keyboard encoding logic devices for data processing or communication systems.

The use of digital data processing techniques and equipment has increased phenomenally in the past decade. As a consequence, tremendous advances have been made in data processing technology, resulting in greatly more sophisticated procedures and apparatus. More and more users are seeking the aid of such procedures and apparatus to solve their problems. However, few of these users are able, even if willing, to devote the necessary time and expense to learning slow, arduous methods of gaining effective access to such equipment.

Consequently, there has been felt an ever growing need for simple easy-to-operate apparatus for interfacing between man and machine. Thus, in a preferred embodiment of the present invention a keyboard, a device familiar to the average user, becomes part of the interface between a user and his digital equipment.

It is therefore an object of the present invention to provide a simplified manually operated data input system.

It is another object of the present invention to provide an improved magnetic keyboard apparatus devoid of keyswitch make or break contacts.

It is a further object of this invention to provide a keyboard assembly having an electronic lockout facility.

SUMMARY OF THE INVENTION

In keeping with the basic philosophy of making access to sophisticated systems easier and more efficient, the apparatus of the present invention was devised. This apparatus comprises a keyboard and unique logic encoding circuitry.

The keyboard itself, in accordance with one embodiment of the present invention, comprises a number of keys, each of which has a permanent magnet attached to it. The magnet on each key moves between a first position assumed when the key is undepressed and a second position assumed when the key is depressed. An array of ferrite cores including a core for each key of the keyboard is advantageously positioned such that depression of a key moves the permanent magnet on that key into the vicinity of the core associated with that key only. A permanent magnet placed in the vicinity of a ferrite core affects the magnetic properties of that core, for example, by providing a biasing field. This change in the magnetic characteristics of the cores provides a means for indicating whether a key has been depressed or not. That is, well-known logic circuitry is utilized to determine the magnetic state of each core of the array and thus, whether or not the key associated with that core has been depressed. Also, because of the fact that there is no mechanical lockout in this system, it is desirable to provide means whereby the operator is informed of the effectiveness of a keystroke. In addition, it has been found that keys which produce a sound when depressed are more familiar to operators. The psychological effect of noiseless keystrokes is to produce doubt in the operator, thus retarding his efficiency. Consequently, the addition of sound-producing means renders operators more comfortable and, hence, more efficient. A clicker mechanism is used in one embodiment of the present invention to serve the dual purpose of signalling the transmission of a key address and providing the recommended audible indication of keystroke.

It is consequently a feature of the present invention that an array of switching devices is controlled by a complementary array of key switches.

It is another feature of the present invention that circuitry is provided to repetitively scan each of a plurality of magnetic devices associated with a corresponding plurality of keys to determine changes in the magnetic state of these magnetic devices, thereby to determine the identity of one or more of the keys which may have been depressed since the immediately preceding scanning cycle.

It is a still different feature of this invention that only the information associated with keys depressed one at a time will be transmitted to utilization circuitry.

A still different feature is that the address of a key depressed only once will not be transmitted more than once unless so intended.

It is a further feature of this invention that an audible indication is given to signify when the address of a key has been transmitted.

DESCRIPTION OF THE DRAWINGS

The apparatus of the present invention will be described in more detail in connection with a specific embodiment thereof shown in the accompanying drawing in which.

DETAILED DESCRIPTION

Figure 1:
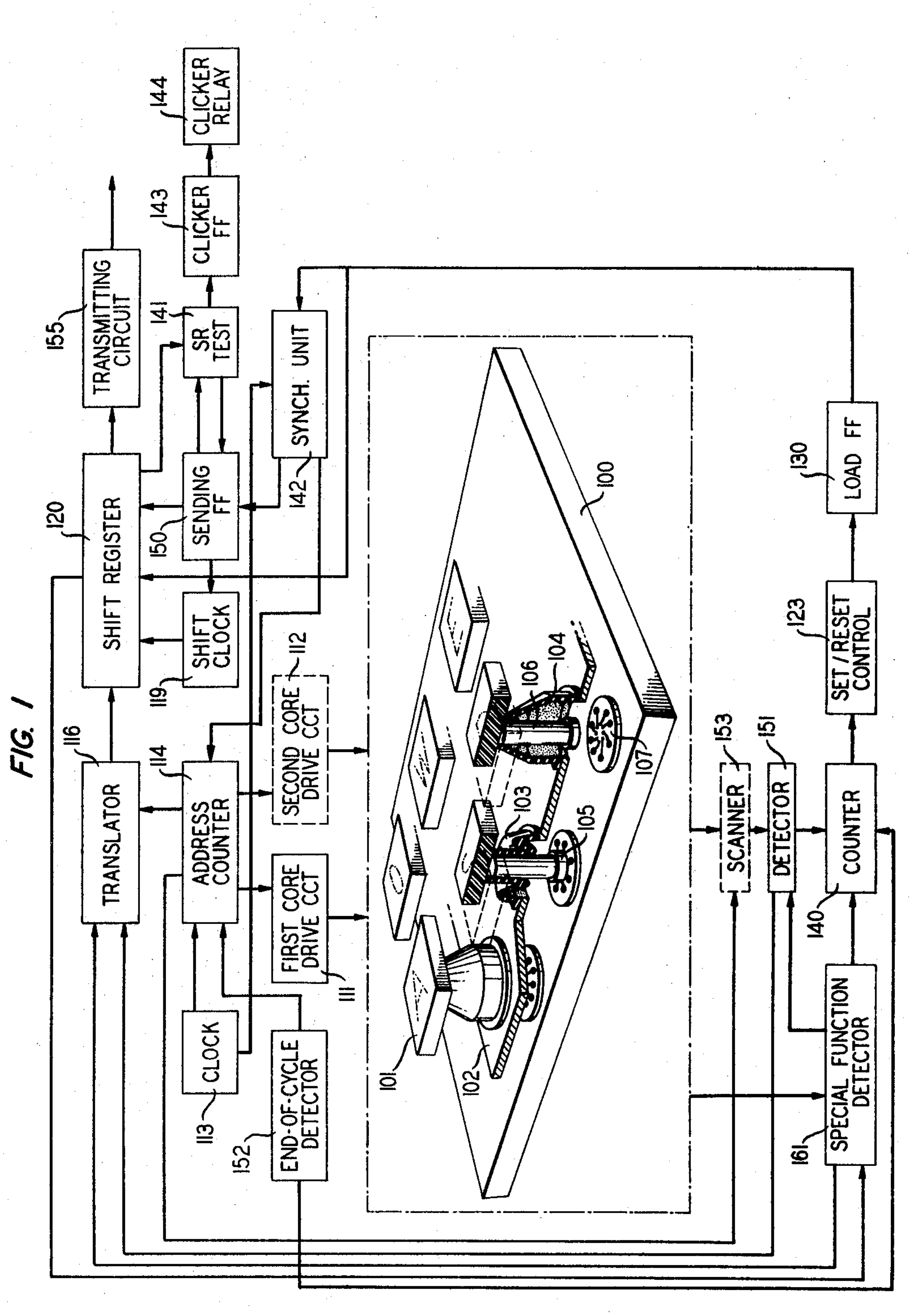
FIG. 1 is a combined block diagram and perspective view of the apparatus of a preferred embodiment utilizing principles in accordance with the present invention.

As shown in FIG. 1, a preferred embodiment of the present invention comprises a number of elastomer-spring keys 101 of a well-known type which are arranged on a base structure 102 to correspond to a standard keyboard. The elastomer springs are in the form of collars which deform elastically when a key is depressed. These collars are shown in cutaway view in FIG. 1 in the depressed and undepressed states as 103 and 104, respectively. When a key is released the collar associated with that key automatically resumes its undeformed condition, returning the key to its undepressed position. Each key is also equipped with a permanent magnet 105 on a plunger 106 which moves downward as the key is depressed. An array of ferrite core units, each designated 107 in FIG. 1 and each containing one core per unit, is aligned on substrate 100 such that depression of a key moves the magnet on the plunger on that key close to a core uniquely associated with that key in the array.

The ferrite core units of the array of the preferred embodiment of the present invention may be constructed in accordance with the methods and teachings of a copending application by P. S. Kubik, Ser. No. 848,610, filed Aug. 8, 1969. The Kubik application outlines an injection molding technique for fabricating, among other things, disc-shaped ferrite core plug-in units. Each of these units includes a ferrite core imbedded in plastic and appropriate conducting (interrogation and readout) windings about the core. The plug-in units also have conducting pins which support the units on a substrate such as 100 in FIG. 1 and which link the windings and circuitry on the units with circuitry on the substrate when desired.

Figure 1A:
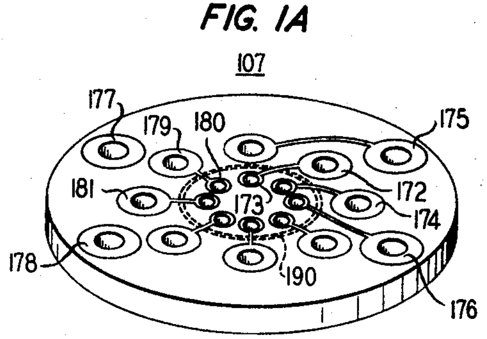
FIG. 1A is an enlarged view of one of the core units of the preferred embodiment of the present invention.

FIG. 1A includes an enlarged view of one of the core units of the array, for example, core unit 107. In accordance with the teachings of the above-designated Kubik application, a core 190 (shown in dotted outline in the enlarged view of core unit 107) in each of the core units has windings about it which are formed by selectively copper plating paths on both sides of and through the unit. For example, a path is shown on the enlarged core unit of FIG. 1A extending from a plated through-hole designated 172 to a plated through-hole designated 173. A second plated path on the reverse side of the unit joins through-hole 173 with through-hole 174. Through-holes 175 and 176 are each one end of one winding about the imbedded core including (among others) the paths between through-holes 172 and 173, and 173 and 174. That is, these paths are arranged to pass over and under the core so that when connected by the plated through-holes they completely encircle the core, thereby forming the required winding. Additional paths on both faces of the unit join all the through-holes of a single winding. A second winding has terminals corresponding to through-holes 177 and 178. This second winding includes the path (on the visible face of the core unit 107) from through-hole 179 to through-hole 180, the path (on the reverse side of the unit and, therefore, not visible) between through-holes 180 and 181. The paths among all the through-holes of a group forming a winding are completed in the same manner as those described above. In this way, windings are applied to the ferrite cores imbedded in the core units.

In the present invention, there is conveniently supplied a number of these plug-in units, one corresponding to each key, which are arranged on a properly wired substrate to form the array.

The ferrite cores are conveniently arranged in a regular array, one core corresponding to each key of the keyboard. The arrangement in the preferred embodiment for ascertaining the switching status of the cores utilizes nonsaturating current driving signals. In accordance with this non-saturating current arrangement then, a burst of high-frequency current is applied by first core drive circuit 111 to one winding of each core in each row, one row at a time from top to bottom.

An additional or second winding is included on each of the cores of the array. The second windings on each of the cores of the first column are connected in series, as are the second windings on all cores in each of the remaining columns. If a key is depressed, positioning a permanent magnet near a core, the core becomes saturated and no current will be induced in the second winding on that core in response to the high-frequency signal applied to the first winding. Transistor pulse circuitry represented by scanner 153 controls the sequential sampling of each of the series-connected second windings associated with each column. Thus, as a pulse is applied to each row, one row at a time from top to bottom, the columns are sampled in sequence, from left to right, and the resultant signals, if any, are transmitted to amplifying and sensing circuitry represented by detector 151. This latter circuitry comprises standard magnetic device sense circuitry arranged to supply an output pulse when a burst of high frequency is inhibited by the depression of a key.

A different arrangement for ascertaining the switching status of the cores utilizes coincident current driving signals. Accordingly, one terminal of one winding on each of the cores responds to signals from first core drive circuit 111. Similarly, the other terminal of that winding responds to signals from a second core drive circuit 112 (shown in dotted notation). Each of the horizontal drive terminals of the first row are connected together as are the horizontal drive terminals of each of the remaining rows. Correspondingly, each of the vertical drive terminals of the first column are connected together, as are the vertical drive terminals at each of the remaining columns. Diodes are advantageously connected between the vertical drive terminals in a well-known fashion to prevent the drive signals from one row or column from being inadvertently routed to a different row or column. When a core is switched in response to the coincidence of horizontal and vertical drive currents a current is induced in a second winding on the core which is sensed again by detector 151. Again, detector 151 is conveniently arranged to supply an output pulse when a core is inhibited from switching by virtue of the magnetic bias applied to it upon depression of a key. Because the core-saturating coincident current interrogation scheme operates on a core-by-core basis, no scanning of the core outputs is required as was the case for the nonsaturating arrangement previously described; thus, scanner 153 is not strictly necessary as indicated by its dotted representation.

These and other arrangements for switching and sensing the switched condition of magnetic core arrays are well known in the art. A typical discussion of a sampling of such arrangements is included in *Digital Applications of Magnetic Devices* by A. J. Meyerhoff, John Wiley and Sons, Inc., 1960, at pp. 359–426.

Regardless of the particular scanning and detection circuitry used, there is also provided in the preferred embodiment of the present invention illustrated in FIG. 1 a counter 140 of standard design for counting the number of cores affected by the depression of corresponding keys during a complete scan of the array of cores. The state of counter 140, representing as it does the number of depressed keys during a complete scanning cycle, is used to control the state of load flip-flop (load FF) 130 through set-reset control circuit 123. Each of these latter two logic circuit configurations is of standard design; the detailed function of each (and therefore its logical design details) will be described in a later portion of this specification. It will suffice, however, to say that load FF 130 is set whenever counter 140 indicates that any number of cores other than one has been found to be depressed during a scan cycle. Conversely, load FF 130 is reset whenever counter 140 indicates that exactly one key has been found to have been depressed during a scan cycle following a scan during which only one key was depressed.

In addition, FIG. 1 shows clock 113 which provides the basic cycle timing and address counter 114 responsive to clock pulses from clock 113 for advancing sequentially through address states corresponding to the various cores and therefore to their associated keys. The output signals from address counter 114 are supplied to the drive circuit 111 (and where called for, drive circuit 112) which actually performs sequential interrogation of the cores in response to these output address signals. End-of-cycle detector 152 provides (using straightforward translation techniques) an indication of the completion of a scanning cycle, which indication is forwarded to counter 140 for purposes of resetting it. Shift register (SR) 120 is of standard design and is arranged such that information may be read into or read out of it in either serial or parallel fashion.

Output signals from address counter 114 are also supplied to translator 116 which controls the passage of address data from address counter 114 to shift register (SR) 120. In particular, detector 151 is adapted to transmit an output signal to translator 116 when detector 151 senses an unresponsive core. The signal transmitted to translator 116 is conveniently adapted to be gated with the contents of translator 116 thereby to transfer the depressed key address in translator 116 into SR 120.

At this point it is noted that translator 116 is advantageously arranged to allow the arbitrary placement of keys on the keyboard. That is, the address of each core bears a relation only to its position in the array. Translator 116 converts the address of each core into a meaningful code representative of the character associated with that core. This "meaningfulness" ' is of course with regard to the systems with which the keyboard of the present invention is intended to interact. In this manner, the character "A" may be located on any arbitrary key and the translator programmed to produce the desired coded signal for "A" when that arbitrarily chosen key is depressed, regardless of the location of that key. The actual address-to-code translation is accomplished using well-known logic circuit code translation circuitry. (The address information is just a special internal coding). Henceforth, although some translation may be incorporated to make the keyboard system of the present invention useful to the world-at-large, the data entered into SR 120 and selectively transmitted therefrom will continue to be spoken of as "address information."

Address information entered into SR 120 is arranged to have the three leftmost bits set to one. This bit arrangement may be attained by suitably modifying translator 116 or by independently setting the leftmost (or all of the) bits of SR 120 to one and then entering in parallel fashion the address information from counter 114 into SR 120 at bit positions starting with the fourth from the left and continuing to the right.

Also shown in FIG. 1 is shift clock 119 which supplies the required pulses to propagate data through shift register 120 where, as in the preferred embodiment, information is shifted out of SR 120 in serial fashion.

Sending flip-flop (FF) is of standard design and is arranged to selectively block and unblock the output of SR 120 in standard fashion under the control of both the load FF shown as 130 in FIG. 1 and synchronizing unit 142. When sending FF 150 is set, it enables shift clock 119, thereby causing information to be shifted serially from SR 120. When load FF 130 is reset, the sending FF is set thereby blocking the output of SR 120. At the same time sending FF 150 is set, a synchronizing interval is introduced by synchronizing unit 142. As mentioned above load FF 130 is in turn responsive to counter 140 which counts the number of unresponsive cores encountered during a scan of the core array. Detector 151, a standard core output sensing circuit actually determines when an unresponsive core is encountered during scanning. As indicated above, end-of-cycle detector 152 provides an indication of the completion of a scanning cycle, which indication is forwarded to counter 140 for purposes of resetting it.

Load FF 130 is also arranged to control the passage of address data to SR 120; when set (indicating, for example, "zero depressed keys on the previous scan cycle") and when counter 140 indicates that a single unresponsive core has been encountered in a present complete scanning cycle, load FF 130 is reset thereby causing the input of SR 120 to be blocked in standard logic gating fashion. When set again by an indication that zero (or two or more) keys are depressed, load FF 130 unblocks the input of SR 120. Set/reset control circuit 123 provides the necessary code translation of the state of counter 140 to set and reset load FF 130.

The block labelled SR TEST and identified by the numeral 141 is arranged to test the contents of bit positions in SR 120. In particular, since the last three bits of the encoded information are arranged always to be ones at the time they are entered into SR 120, SR TEST 141 is adapted according to well-known techniques to provide two output indications, one when not all of the bit positions in SR 120 are zero at the same time that the sending FF 150 is set and a second when all bit positions in SR 120 are zero with sending FF 150 set.

Synchronizing unit 142, which responds to load FF 130, advantageously adjusts the scanning timing such that each scanning cycle is resumed at the beginning of the core array. This may be accomplished, for example, by resetting address counter 114 to the initial array address for an interval suitable for allowing all of the data in SR 120 to be shifted out in serial fashion.

Clicker FF 143 is set by signals from SR TEST 141 whenever sending FF 150 is set and not all of the digit positions of SR 120 are nonzero. This occurs, for example, when exactly one key is depressed and its coded representation is entered into SR 120 prior to being transmitted. When clicker FF 143 is set it causes clicker relay 144 to be operated. Clicker FF 143 is reset whenever SR TEST 141 provides an indication that all of the bit positions change to zeros while the sending FF 150 is set (thereby indicating the complete shifting out of data from SR 120). Whenever clicker FF 143 is reset, it causes clicker relay 144 to be released. Clicker relay 144 comprises a hinged armature, a winding about the armature, and a stationary plate. When the winding about the armature is energized by current from clicker FF 143, the armature is attracted to the stationary plate thereby producing an audible click. When the pulse is removed, the armature is released and returns to its unattracted position.

Thus, in response to both the state of sending FF 150 and the information in SR 120, SR TEST 141 generates and transmits set/reset signals to clicker FF 143 which result in a pulse of duration adequate to operate clicker relay 144. That is, when sending FF 150 indicates that the information in SR 120 represents a single keystroke and is to be transmitted, SR TEST 141 advantageously utilizes the information in SR 120 to produce a properly timed pulse to be applied to clicker FF 143 and thence to clicker relay 144.

Transmitting circuitry 155 in FIG. 1 represents conventional data transmitting circuitry suitable for communicating with a computer or other data sink.

TYPICAL OPERATING SEQUENCE

Figure 2:
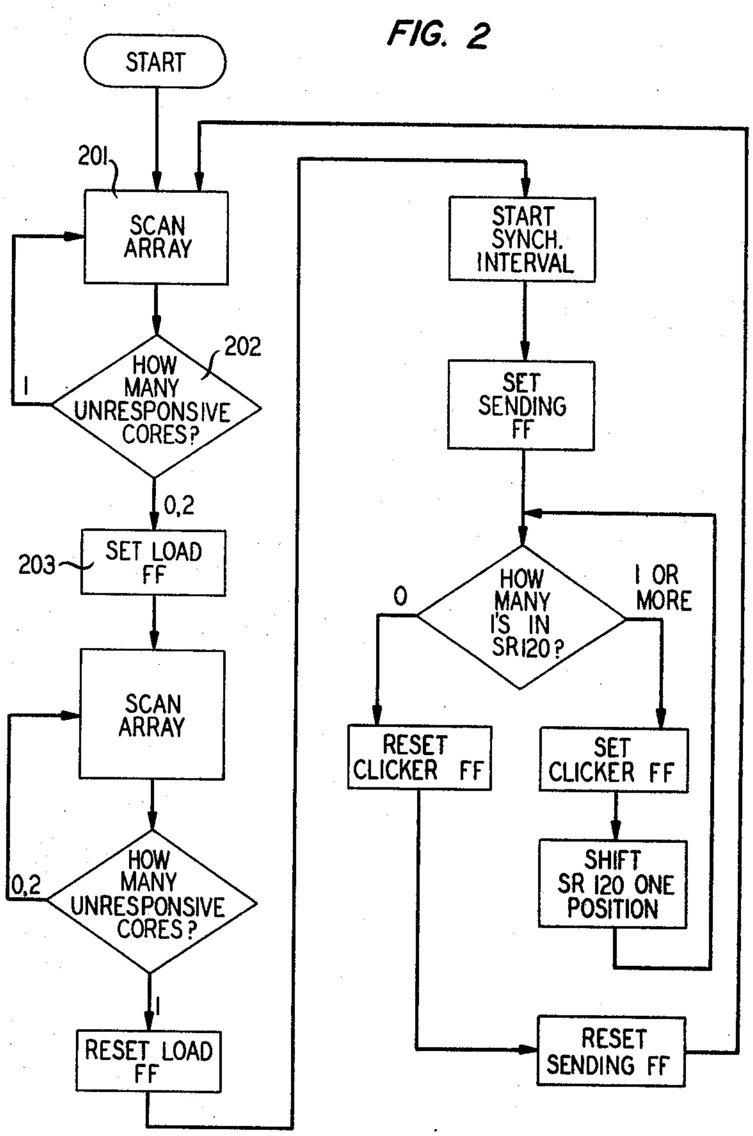
FIG. 2 is a flow chart representation of the order of operation of the apparatus of the preferred embodiment shown in block diagram form in FIG. 1.

The present invention can be better understood by reference to the flow chart of FIG. 2 which will serve to clarify the order of operation of the apparatus of a preferred embodiment of illustrated present invention illustrated in block diagram form in FIG. 1.

To simplify the explanation of the flow chart of FIG. 2, it will be assumed that the operation of the apparatus is initiated with no keys depressed. Utilizing well-known drive circuitry described above, each of the cores of the array is pulsed a first time to determine how many of the cores, if any, have failed to switch. As indicated above, when a key is depressed, the permanent magnet on that key is positioned near the ferrite core designated for that key. The presence of a permanent magnet close to the core saturates that core preventing it from being switched when signals, otherwise adequate to switch the core, are applied to it. Consequently, an indication that a core has not switched in response to appropriate switching pulses signifies that the key associated with that core has been depressed. Of course, the nonsaturating core arrangement described above will give substantially equivalent key depression data.

Initially then, it will be assumed that the input and output terminals of SR 120 shown in FIG. 1 are blocked, that is, both load FF 130 and sending FF 150 are reset. All the cores of the ferrite core array are pulsed in sequence, or scanned, by means of clock 113, address counter 114 and drive circuitry 111 (and 112, where appropriate, and scanner 153, where appropriate) a first time as indicated by block 201 of FIG. 2. An indication that a particular core has not experienced a change in state at the incidence of the specified pulses signifies that the key associated with that core is depressed. The number of such unresponsive cores during a full scan of the array is sensed at detector 151 and tallied by means of counter 140 as indicated by block 202 of FIG. 2. The notation "0, 2" as one choice on decision blocks such as 202 is to be interpreted as "0, 2 or more than 2." Under the present assumption, the number of keys depressed is initially zero. Block 203 of FIG. 2 indicates that the load FF 130 is set through set/reset control 123 in response to signals indicating that the count of unswitched cores is zero.

Load FF 130 is set and the input to SR 120 is unblocked whenever the count of depressed keys is any number other than one. The requirement that no keys (or two or more keys) be depressed before address information can be entered into SR 120 constitutes part of a lockout feature which prevents the erroneous transmission of the address of multiple depressed keys. As will be seen, it is necessary that a scan yielding an indication of but a single depressed key must follow an indication that zero (or two or more) keys had been previously depressed.

Setting load FF 130 allows the input to shift register 120 to be unblocked. With the input to shift register 120 unblocked, the cores are again scanned. If no key has been depressed since load FF 130 was set, no address information is entered into shift register 120 even though its input is unblocked. On the other hand, if one or more keys have been depressed since load FF 130 was set, the address of each is transferred to shift register 120, the address of one key-core combination obliterating that of a previously entered combination in shift register 120. As long as the number of keys depressed is zero or two or more, the addresses of all keys depressed will be continuously entered into the shift register and written over since the output of SR 120 is still unblocked. That is, no information is transmitted from the shift register as yet. At the end of each scan cycle, counter 140 is cleared of the count accumulated during that scan cycle.

When an indication is given that the number of unresponsive cores, and consequently the number of depressed keys, is exactly one during a single scan of the cores of the array, load FF 130 is reset, again blocking the input to SR 120. Blocking the input of SR 120 in this manner prevents the address of the single key address in SR 120 from being written over. It should be understood that the resetting of load FF 130 and therefore the blocking of the input and output terminals of the several other functional blocks of the system during a given complete scanning cycle of all of the keys is determined by the number of unresponsive keys encountered in a just-completed scanning cycle. Thus, if a one-key-down condition follows a zero- or two-key-down condition, and only then, will the end of a scan cycle find an address in SR 120 which is to be transmitted. When this occurs, the input to shift register 120 is blocked as mentioned to prevent obliteration of the single depressed key address.

As a result of load FF 130 being reset, sending FF 150 is set through synchronizing unit 142. Synchronizing unit 142 is arranged to set sending FF 150 at the beginning of a synchronizing interval during which array scanning is conveniently suspended by inhibiting the advance of counter 114. This may be conveniently achieved by clamping counter 114 to the address of the initial array location for a duration sufficient to complete the shifting out of the address data in SR 120. The setting of sending FF 150 thus unblocks the output of SR 120, allowing the address information within the shift register to be transferred to transmitting circuit 155. This information is transmitted on a bit-by-bit basis under the control of shift clock 119.

Following the setting of sending FF 150, all stages of SR 120 are interrogated (monitored). Since the last three bits of each data item of SR 120 are arranged to be ones initially, an indication that all stages of SR 120 contain signals representative of zeros signifies that the address information stored in SR 120 has been completely shifted out. The information representative of a character to be transmitted is also used to generate a pulse capable of both setting clicker FF 143 and, as indicated above, attracting the armature to the stationary plate of clicker relay 144. When all the stages of SR 120 contain zeros, that is, when the register has been cleared, the clicker FF 143 is reset and clicker relay 144 is released in preparation for the next transmission. When the sending of the address data from SR 120 is complete, sending FF 150 is again reset. The one bits entered in the last bit positions of SR 120 may readily be stripped from the output bit stream by transmitting circuit 155, when desired, prior to transmission. Alternatively, they may remain in the bit stream as an aid to transmission synchronization.

It is clear that other techniques may be used to monitor the contents of SR 120 to detect the complete transmission of a key address. The use of the initially preset one bits together with a search for a subsequent "all zeros" condition is merely illustrative.

Further, as stated, when the indication is given by detector 151 at the end of a scan cycle that only one key was depressed during that cycle, load FF 130 is reset, resulting in the blocking of the input to SR 120. The input to SR 120 is not unblocked until detector 151 senses that the number of keys depressed during a given cycle is zero or two or more. Consequently, if a key is held depressed beyond the transmission of its address data, its address will not be retransmitted simply because there is an indication of a one-key-down condition. The key must be lifted or another key simultaneously depressed before load FF 130 is again set and information again entered in SR 120. It is noted that the simultaneously depressed key must be released to initiate a signal capable of setting sending FF 150, thus unblocking the output of SR 120. This is true also of a key held depressed during system activation. Such a key must be released after activation before any information can be entered into SR 120.

A key repeat feature is also included in the preferred embodiment of the present invention. In accordance with this feature a so-called repeat key is simultaneously depressed with an information key when the address of the information key is to be repeatedly transmitted without requiring that the information key be lifted. The repeat key is included in the scan of the core array but has its output connected to a portion of the special function detector 161 which, when the repeat key is depressed, controllably generates pulses capable of changing the count of counter 140. That portion of the special function detector 161 used for detecting repeat key depressions, except for the differences to be noted, may assume the same configuration as detector 151. As will be seen shortly, the other portions of special function detector 161 are useful for detecting depressions of other special keys.

The repeat key is advantageously arranged to be pulsed after the information keys have all been pulsed. In addition, the repeat portion of special function detector 161 is sensitive to the information in SR 120 in that it is arranged by standard circuit techniques to be inhibited from generating an output pulse by a not-all-zero condition in SR 120. Consequently, after a first full scan of the array has indicated that zero or two keys are depressed, a second scan is begun with the load FF 130 set. A single information key and the repeat key are assumed to be held depressed during the second scan. The address of the information key is entered into SR 120 before the repeat key is detected. Because SR 120 contains address information, no pulse is generated by the repeat portion of special function detector 161 in response to depression of the repeat key to affect the count in counter 140. However, when the information has been fully transmitted from SR 120 and all the bits in SR 120 are zeros, the repeat portion of special function detector 161 is no longer inhibited and therefore adds one to the count in counter 140 changing it from one to two. Once the count changes from one to two following transmission, the address of the information key is entered into SR 120 on next scan cycle. Because of the fact that there is an address in SR 120 upon this next scan, the special function detector 161 does not generate a pulse to alter the count of counter 140 in response to depression of the repeat key. This alternate inhibition and noninhibition of the repeat portion of special function detector 161 continues for as long as the repeat key and information key are simultaneously depressed. This combination thus repetitively produces the alternation of the "0, 2 or more than 2" state with the "exactly 1" state in counter 140 which alternation has been seen to be necessary for the transmission of address information.

In addition to the repeat function, there are also provided in the preferred embodiment of the present invention, a shift function and one or more control functions each selectable by the depression of a different key. The cores of the array associated with each of these keys have their output signals connected to respective portions of special function detector 161. Each of these portions is substantially identical to detector 151 except that the output of these circuit portions are connected to translator 116. When the shift key is depressed, for example, special function detector 161 produces a signal which alters prespecified address bits to indicate a capital letter, for example. This is accomplished, for example, by causing translator 116 to invert (using well-known circuit techniques) specified address bits prior to loading the address into shift register 120. Similarly, depression of one of the control keys is arranged to alter certain other bits as they are processed by translator 116. Note that the shift and control keys (as well as the repeat key on some occasions) are not counted by counter 140 in determining the number of depressed keys.

It is understood that the above-described apparatus is only illustrative of the application of the principles of the present invention. In accordance with these principles, numerous other arrangements may be devised by those skilled in the art without departing from the spirit and scope of the invention. In particular, it should be noted that any one of a number of suitable means might be substituted for the keys described above. There are numerous mechanical pushbutton-type switches readily available, or, combinations of mechanical, electrical or electromechanical devices might be used to effect transposition of the permanent magnet.

It is also considered to be entirely within the scope of the present invention to use switches other than those capable of translating a permanent magnet from one position to another. For example, so-called proximity or limit switches, capacitive-effect, light-sensitive, pressure-sensitive, piezoelectric and similar type switches might be used in place of the switches described in the preferred embodiment. Such a substitution necessarily implies modifications in the array sensitive to the key switches, which modifications are also deemed to be within the spirit and scope of the present invention.

What is claimed is:

1. In combination in an electronic logic encoding keyboard arrangement, a. a plurality of ferrite cores each having a number of conducting wires wound thereon, b. a plurality of movable key elements each having a magnetic device attached thereto, each of said key elements arranged such that when one of said key elements is depressed said magnetic device attached thereto may be positioned adjacent one of said ferrite cores, c. means for applying electric current to selected ones of said conducting wires, d. sensing means connected to other ones of said conducting wires for ascertaining the electric current transforming capabilities of said cores to determine which of said key elements is depressed, e. means for generating a different digital signal for each of said cores, f. an output shift register, g. recording means for recording the total number of key elements depressed during a selected interval, h. blocking means for generating a first signal when the number of said key elements depressed during a selected interval is one and for generating a second signal when the number of key elements depressed during a selected interval is other than one, i. means responsive to said sensing means for selectively applying said digital signals to said output shift register, and j. transmitting means responsive to said blocking means for causing said digital information to be transmitted from said output shift register when said blocking means second signal during one interval is succeeded by said blocking means first signal during the next interval.

2. Apparatus as in claim 1 wherein said recording means further includes means for changing the total number of depressed key elements recorded by said recording means in response to the depression of a first key element whereby the digital signal for a second depressed key element is repetitively transmitted by said transmitting means while said first and second key elements remain depressed.

3. Apparatus as in claim 1 further comprising a translator for translating said digital signals from said means for generating into coded signals representative of the symbol specified by a key element and ferrite core combination.

4. Apparatus as in claim 1 wherein said means for applying electric current to said conducting wires comprises:

a. a source of pulses, b. a first driving circuit for applying pulses of a first duration from said source of pulses to the first terminal of a first conducting wire on each of said cores, c. a second driving circuit for applying pulses of a second duration from said source of pulses of a second duration from said source of pulses to the second terminal of said first conducting wire on each of said cores, and d. means connected to a different one of said conducting wires for sensing the coincidence of pulses on said first conducting wire from said first and second driving circuits.

5. In combination in an electronic keyboard arrangement, a. an array of encapsulated ferrite core plug-in elements and a corresponding array of depressable key elements each having a magnet attached thereto, said array of key elements arranged such that the magnet attached to each key element alters the response of at least one ferrite core to electrical stimulus when said key element is depressed, b. scanning means for applying electrical stimuli to each of said ferrite cores in sequence and for sensing the response of each of said cores to said electrical stimuli, c. first coding means responsive to signals from said scanning means for generating a different digital signal for each key element, d. second coding means responsive to said first coding means for generating a still different digital signal for each digital signal generated by said first coding means, e. recording means responsive to signals from said scanning means for recording the number of key elements depressed during a specified interval, f. a multistage shift register, g. means responsive to signals from said recording means for applying signals from said second coding means to the input of said multistage shift register and for disabling the output of said multistage shift register when said recording means signifies a transition from a recorded count of other than one key element depressed to only one key element depressed, h. means connected to the output of said multistage shift register for transmitting the digital signals in said multistage shift register, and i. means for selectively blocking the input to, and unblocking the output of, said multistage shift register regardless of the count recorded by said recording means.

* * * * *

UNITED STATES PATENT OFFICE
CERTIFICATE OF CORRECTION

Patent No. 3,675,240 Dated July 4, 1972

Inventor(s) Robert V. Anderson David W. Hagelbarger

It is certified that error appears in the above-identified patent and that said Letters Patent are hereby corrected as shown below:

Column 6, Line 67, "unblocked" should read --blocked--.

Column 10, Lines 10 and 11, delete "of a second duration from said source of pulses".

Signed and sealed this 17th day of October 1972.

(SEAL)
Attest:

EDWARD M.FLETCHER,JR.
Attesting Officer

ROBERT GOTTSCHALK
Commissioner of Patents